United States Patent [19]

Ligon et al.

[11] Patent Number: 5,542,582

[45] Date of Patent: Aug. 6, 1996

[54] DISPENSING SYSTEM FOR PARTICULATE MATERIAL

[76] Inventors: Robert M. Ligon, 5630 E. Rockridge, Phoenix, Ariz. 85018; Thomas B. Carter, 2114 E. Evans Dr., Phoenix, Ariz. 85022

[21] Appl. No.: 278,879

[22] Filed: Jul. 22, 1994

[51] Int. Cl.$^6$ .................................................. G01F 11/06
[52] U.S. Cl. ...................... 222/342; 222/522; 251/149.2; 414/411
[58] Field of Search .................................. 222/342, 522, 222/225, 509, 559, 181.1, 181.2, 181.3, 185.1; 901/41; 251/149.1, 149.2; 414/411, 292, 299

[56] References Cited

U.S. PATENT DOCUMENTS

| | | | |
|---|---|---|---|
| 445,067 | 1/1891 | Lyon | 222/522 |
| 2,706,581 | 4/1955 | Albers | 222/181.2 |
| 4,214,729 | 7/1980 | Narfgren | 251/149.2 |
| 4,586,694 | 5/1986 | Jones | 251/149.2 |
| 4,635,827 | 1/1987 | Roedig | 901/41 |
| 4,993,132 | 2/1991 | Manz | 901/41 |
| 5,020,278 | 6/1991 | St. Angelo, Jr. et al. | 901/41 |
| 5,105,981 | 4/1992 | Gehman | 222/185.1 |

FOREIGN PATENT DOCUMENTS 0164722  6/1992  Japan ........................... 414/292

*Primary Examiner*—Andres Kashnikow
*Assistant Examiner*—Lisa Douglas
*Attorney, Agent, or Firm*—Dykema Gossett

[57] ABSTRACT

A dispensing system for particulate matter is disclosed comprising a primary receptacle, a guide member, a sliding tube, and a valve member. The primary receptacle receives particulate material and has an open end, an opposed bottom, and a surrounding wall. The guide member is fixed to the bottom of the primary receptacle and defines a supporting aperture and an associated axis approximately normal to the bottom. The sliding tube is slidably disposed within the supporting aperture of the guide member. The sliding tube is characterized by a longitudinal feed passage therethrough substantially parallel to the axis. The sliding tube has a travel limit restricting its axial translation relative to the guide member between a first position and a second position. The valve member is mounted inside the primary receptacle over the guide member. The valve member has bristles disposed over and operably blocking the supporting aperture. The bristles are displaced radially outward from the axis by the sliding tube as the sliding tube is moved from the first position to the second position.

9 Claims, 3 Drawing Sheets

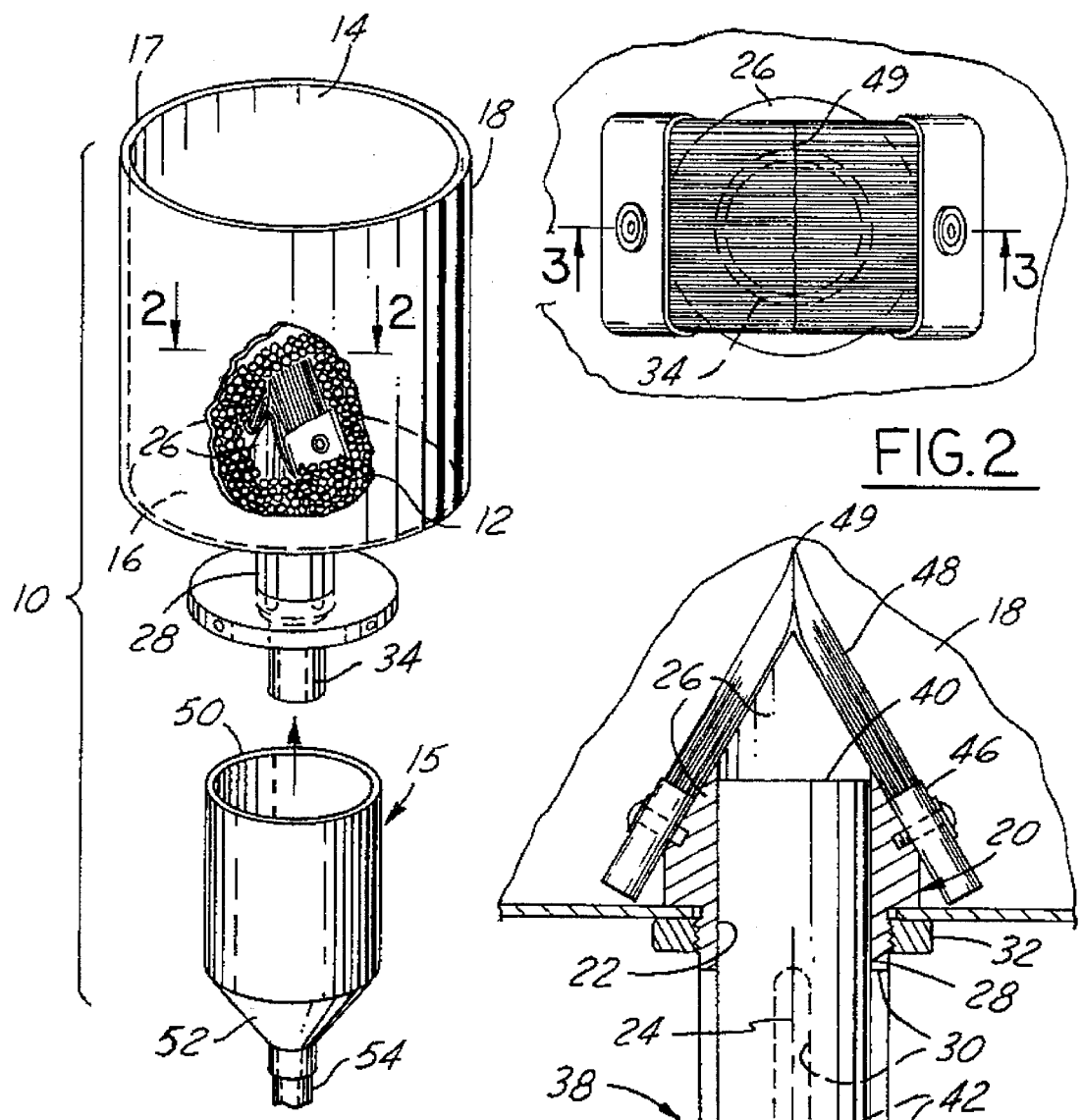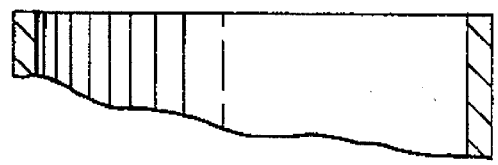

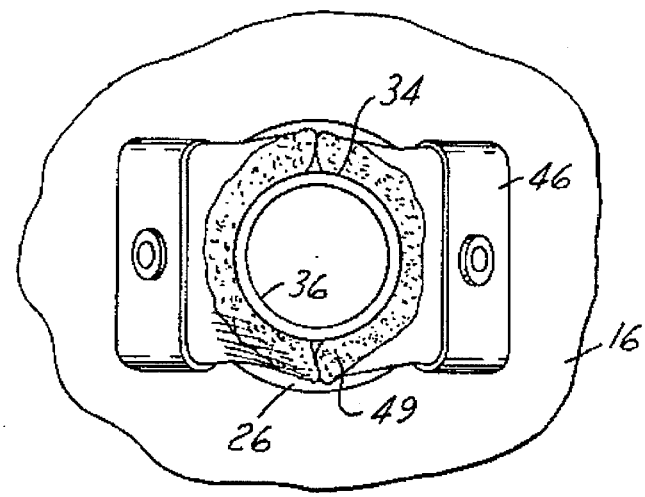
FIG. 4
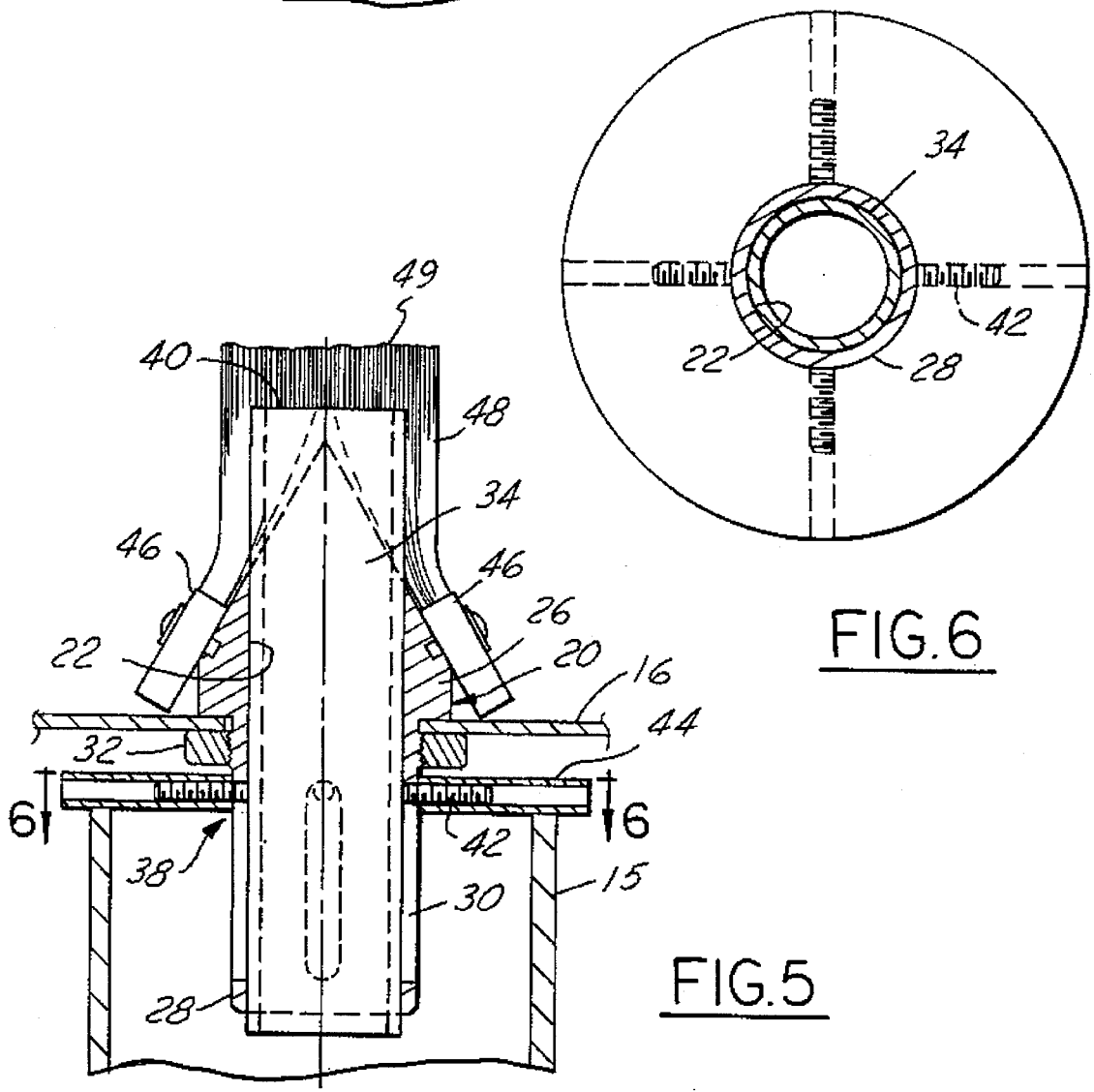
FIG. 6
FIG. 5

DISPENSING SYSTEM FOR PARTICULATE MATERIAL

TECHNICAL FIELD

The present invention relates generally to dispensing systems for particulate material and, more particularly to dispensing systems employed with screw type extrusion devices.

BACKGROUND OF THE INVENTION

Known dispensing systems for particulate material have employed a rotating valve member such as a flapper plate selectively rotated by an electric motor or similar means to open and close the valve. It would be desirable to provide a dispensing system which can dispense a predetermined amount of particulate material with a high degree of repeatability without the expense and complexity of a system having one or more servomotors in the system.

The present invention is directed to overcoming the problems as set forth above.

SUMMARY OF THE INVENTION

In one aspect of the present invention, a dispensing system for particulate matter is disclosed comprising a primary receptacle, a guide member, a sliding tube, and a valve member. The primary receptacle is for receiving particulate material and has an open end, an opposed bottom, and a surrounding wall. The guide member is fixed to and extends through the bottom of the primary receptacle thereby defining a supporting aperture and an associated axis approximately normal to the bottom. The sliding tube is slidably disposed within the supporting aperture of the guide member. The sliding tube is characterized by a longitudinal feed passage therethrough substantially parallel to the axis. The sliding tube has a travel limit restricting its axial translation relative to the guide member between a first position and a second position. The valve member is mounted inside the primary receptacle over the guide member. The valve member has bristles disposed over and operably blocking the supporting aperture. The bristles are displaced radially outward from the axis by the sliding tube as the sliding tube is moved from the first position to the second position, thereby bending the bristles away from the supporting aperture.

The present embodiment provides an improved dispensing system for particulate material providing quantities of a predetermined amount without the need for power servos of any type.

BRIEF DESCRIPTION OF THE DRAWINGS

FIG. 1 is a perspective view of the present invention with a partial cutaway showing the location of a valve member.

FIG. 2 is a view in the direction of arrows 2 of FIG. 1 showing brush members of the present invention without the particulate material.

FIG. 3 is a partial sectional view in the direction of arrows 3 of FIG. 2 with a sliding tube in a first position.

FIG. 4 is a view in the direction of arrows 2 of FIG. 1 with the sliding tube in a second position.

FIG. 5 is a partial sectional view in the direction of arrows 3 of FIG. 2 with the sliding tube in the second position.

FIG. 6 is a sectional view in the direction of arrows 6 of the FIG. 5.

DESCRIPTION OF THE PREFERRED EMBODIMENT

Figure 7:
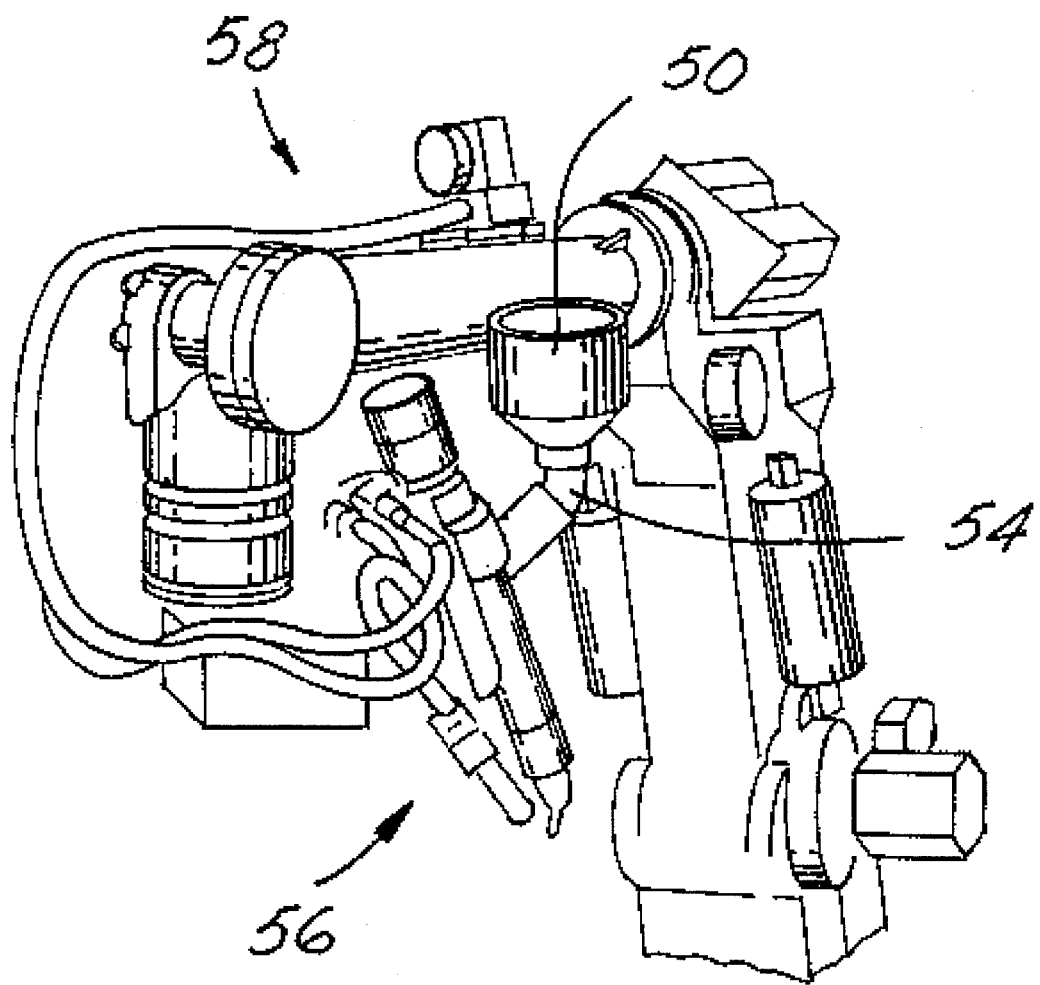
FIG. 7 is a perspective view of a secondary receptacle of the present invention mounted to a robot adapted for operating an extruder.

FIG. 1 shows a dispensing system 10 for particulate material 12. A primary receptacle 14 is disposed in a superior position to a secondary receptacle 15. The primary receptacle 14 is open on a top end 17 and has an opposed bottom 16 and a surrounding wall 18. A guide member 20 is fixed to the bottom 16 and extends through the bottom 16. The guide member 20 defines a supporting aperture 22 therethrough and an associated axis 24 approximately normal to the bottom 16. A portion of the guide member 20 disposed within the primary receptacle 14 is a wedge shaped supporting portion 26. A guide portion 28 of the guide member 20 is disposed below the wedge shaped supporting portion 26 and the bottom 16. The guide portion 28 as shown has four axially oriented slots 30.

The guide member 20 is retained in the primary receptacle 14 by a retaining ring 32 which threads over the guide portion 28 beneath the bottom 16. The retaining ring 32 and the supporting portion 26 together clamp the bottom 16, thereby preventing axial movement between guide member 20 and the primary receptacle 14.

A tube member 34 is slidably disposed within the supporting aperture 22. The tube member defines an axial feed passage 36 therethrough. The tube member 34 also has a travel limit 38 restricting its axial translation relative to the guide member 20 to between a first position and a second position. In the first position, the top edge 40 of the tube member 34 is recessed below the supporting portion 26. In the second position, a top edge 40 of the tube member extends beyond the guide portion 28.

In this embodiment of the present invention, the travel limit 38 is provided by a plurality of threaded rods or set screws 42 disposed in part in a flange 44. The set screws are aligned with and passed through the slots 30 in the guide portion 28 to abuttingly engage the tube member 34. Travel of the tube member 34 is thereby limited when the set screws 42 reach the ends of the slots 30. The flange 44 has an annular disc shape with an inside diameter clearing the guide portion 28. An outside diameter of the flange 44 is sufficiently large to engage the secondary receptacle 15. The flange 44 moves as a unit with the tube member 34. Two valve members 46, or brush members 46, are fixed to opposite sides of the wedge shaped supporting portion 26 so that bristles 48 of the brush members 46, mounted to the opposing sides of the wedge shaped supporting portion 26, contact at their tips 49. Thus engaged, the opposing bristles 48 completely cover the supporting aperture 22 of the guide member 20 with the tube member 34 in the first position.

The secondary receptacle 15 is open on a top end 50 for the receipt of material and has an opposed frustaconical end 52 for funneling material therein to a connector pipe 54. The connector pipe 54 is shown in FIG. 7 as being connected to an inlet port of a screw drive extruder.

The invention operates in the following manner. The primary receptacle 14 is filled with particulate material 12, such as pellets of thermoplastic material, by any known filling means. The secondary receptacle 15 is moved with the screw drive extruder 56 by a robot 58, of which the screw drive extruder 56 is essentially an extension, to a position in which the top end 50 of the secondary receptacle 15 is axially aligned with the tube member 34. The secondary receptacle 15 is then moved upward toward the primary receptacle 14. The secondary receptacle 15 contacts the flange 44 with the flange 44 moving upward from the first position with the secondary receptacle 15. The tube member 34 in turn moves upward with the flange 44 to which it is fixed. Continued upward movement of the secondary receptacle 15 causes the top edge 40 of the tube member 34 to contact the bristles 48 with further tube member movement causing the bristles 48 to deflect or bend radially outward and assume a position parallel with the tube member 34. Illustrations of bristles 48 so deflected are shown in FIG. 4 and FIG. 5. As the opposing bristles tips 49 are separated, the surrounding pellets are able to enter the now exposed axial feed passage 36 of the tube member 34.

Movement of the tube member 34 into the primary receptacle stops when the tube member 34 reaches the second position and the set screws 42 contact an upper end of slots 30. In the second position, the bristles 48 present effectively no restriction of entry of the pellets into the axial feed passage 36. Material flows through the axial passage 36 into the secondary receptacle 15. The secondary receptacle 15 continues to fill until the level of material in the secondary receptacle 15 reaches approximately a bottom of the tube member 34, effectively blocking the passage of additional material from the tube member 34 to the secondary receptacle 15. As the secondary receptacle 15 is withdrawn from the primary receptacle 14 and the tube member 34, material which had backed up in the axial feed passage 36 of the tube member 34 drops from the axial feed passage 36 and into the secondary receptacle 15. The secondary receptacle 15 is then completely withdrawn from the primary receptacle 14, permitting the robot to move the extruder to a work surface to which the extruded material is to be applied.

As the tube member 34 returns to the first position, the bristle tips 49 return to their original positions to block further passage of pellets through the axial feed passage 36. The quantity of pellets received by the secondary receptacle 15 is highly repeatable and is a function of the shape of the secondary receptacle and the depth of the bottom of the tube member 34 in the secondary receptacle 15 when the flange 44 is in contact with the secondary receptacle 15. The amount of material dispensed into the secondary receptacle 15 is sufficient to execute a single application of extruded sealant material from the extruder 56.

It is readily apparent that there are many structural variations of the present invention which would operate equally well. For example, instead of two opposed brushes mounted to a wedge shaped supporting portion, a much larger number of brushes could be mounted to a frustaconical surface with bristles of the brushes forming a conical shape. Alternatively in place of a discrete number of brushes, a unitary bristle retainer with the bristles forming a conical shape could be employed as a valve member. Other variations of the above disclosure are also readily apparent for providing an effective travel limit. One such variation could employ a tube member 34 having a larger outside diameter at its top edge 40. This larger outside diameter would engage a step surface within the guide member 20 to limit downward travel of the tube member 34. The upper travel limit could be provided by a flange 44 or other device used to engage the top end 50 of the secondary receptacle 15. One could also configure the dispensing system to begin dispensing when the tube member 34 engages the bottom 52 of the secondary receptacle 15 instead of the top end 50 of the secondary receptacle 15. This would allow the elimination of the flange 44. Material would escape into the secondary receptacle 15 through openings cut in the wall of the tube member 34.

Other aspects, objects and advantages of this invention can be obtained from a study of the drawings, the disclosure, and the appended claims.

I claim:

1. A dispensing system for particulate material comprising:
   a primary receptacle for receiving material, said primary receptacle having an opposed top and bottom and a surrounding wall;
   a guide fixed to the bottom defining a supporting aperture passing through the bottom and an associated upright axis, the guide having a wedge shaped supporting portion extending above the bottom surface and into the primary receptacle and having a guide portion having at least one guide slot passing therethrough and disposed below the bottom;
   a tube slidably disposed within the supporting aperture of the guide and defining a feed passage therethrough;
   travel limit means for restricting axial translation of said tube relative to the guide between first and second positions; and
   a valve member mounted inside the primary receptacle and having two opposed bristle bearing members fixed to the supporting portion with the bristle tips of the opposed bristle bearing members contacting with the tube in the first position and a substantial number of the tips being separated with the tube in the second position.

2. A dispensing system as claimed in claim 1 further comprising:
   a secondary receptacle having a diameter sufficiently large to receive the tube and defining a volume sufficiently large to retain a quantity of the particulate material suitable for execution of a predetermined process.

3. A dispensing system as claimed in claim 2 further comprising:
   an extruder having the secondary receptacle mounted at an inlet passage of the extruder for entry of the particulate material thereinto.

4. A dispensing system as claimed in claim 3 further comprising:
   a robot selectively positioning the extruder.

5. A dispensing system for particulate material, comprising:
   a primary receptacle for receiving material being open on a top end and having an opposed bottom and a surrounding wall;
   a guide member fixed to the bottom of the primary receptacle and defining a supporting aperture passing therethrough an associated axis of which is normal to the bottom and having both
      a wedge shaped supporting portion extending above the bottom surface into the primary receptacle and
      a guide portion having at least one guide slot passing therethrough and disposed below the bottom surface;
   a tube member slidably disposed in the supporting aperture for axial movement between a first position wherein a top edge of the tube member is disposed within the guide portion and a second position wherein the tube member extends upward beyond the guide portion;
   a flange member radiating out from the shank portion of the primary receptacle and fixed to the tube member through the slot in the guide portion for axial movement therewith and engagement of the flange member with ends of the slot limiting axial travel of the tube member to a range between the first position and the second position; and two opposed bristle bearing members fixed to the wedge shaped supporting portion with bristle tips of the opposed members contacting with the tube member in the first position, thereby preventing passage of particulate material through the tube member, and most of the bristle tips being separated with the tube member in the second position thereby permitting passage of particulate material through the tube member.

6. A dispensing system as claimed in claim 5 further comprising:

a secondary receptacle having a diameter sufficiently large to receive the tube member and defining a volume sufficiently large to retain a quantity of the particulate material suitable for execution of a predetermined process.

7. A dispensing system as claimed in claim 6 further comprising:

an extruder having the secondary receptacle mounted at an inlet passage of the extruder for entry of the particulate material thereinto.

8. A dispensing system as claimed in claim 7 further comprising:

a robot selectively positioning the extruder.

9. A dispensing system for particulate material, comprising:

a primary receptacle for receiving material, said primary receptacle having an opposed top and bottom and a surrounding wall;

a guide fixed to the bottom defining a supporting aperture passing through the bottom and an associated upright axis;

a tube slidably disposed within the supporting aperture of the guide and defining a feed passage therethrough;

travel limit means for restricting axial translation of said tube relative to the guide between first and second positions; and a valve member mounted inside the primary receptacle having two opposed bristle bearing members fixed to the supporting portion with bristle tips of the opposed bristle bearing members contacting with the tube in the first position and a substantial number of the tips being separated with the tube in the second position.

\* \* \* \* \*